Figure 1:
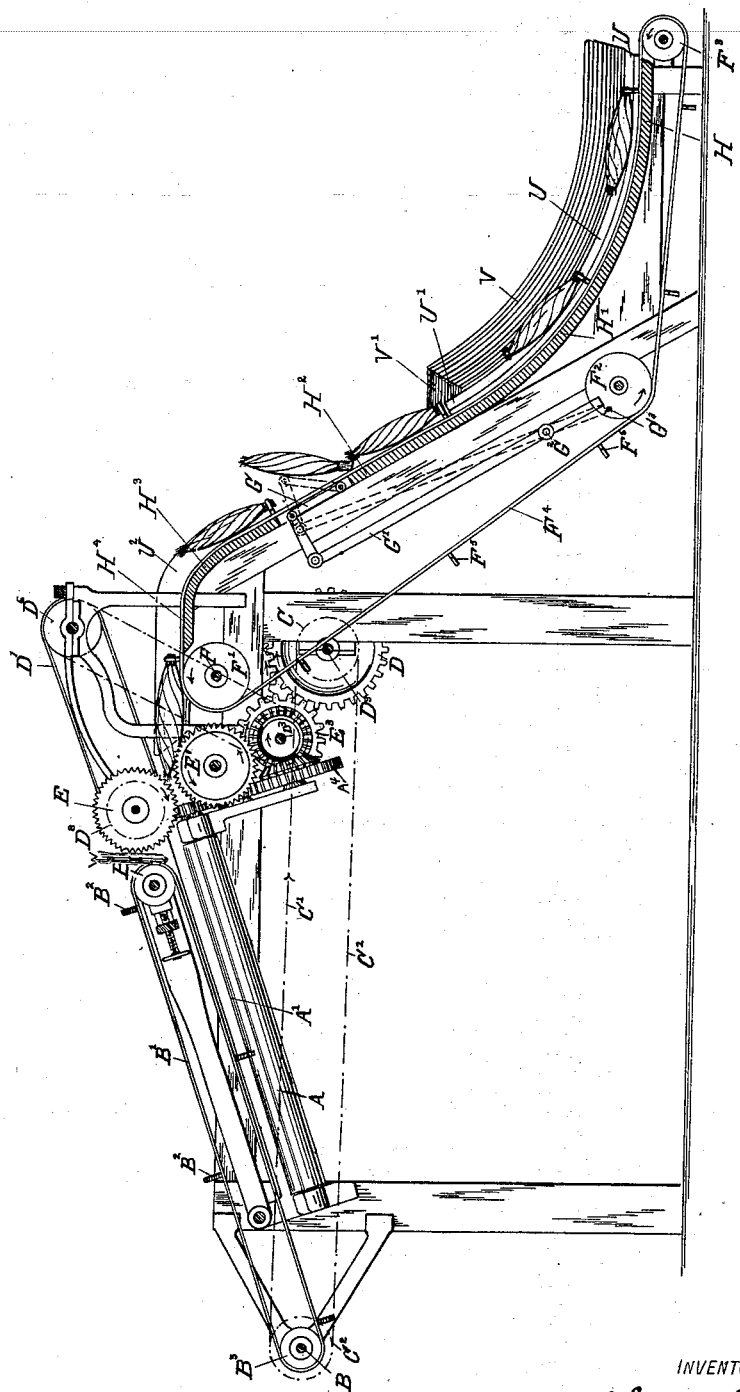

No. 648,484. Patented May 1, 1900.
J. A. CHISHOLM, R. P. SCOTT & W. H. SELLS.
GREEN CORN HUSKING MACHINE.
(Application filed June 15, 1894.)

(No Model.) 3 Sheets—Sheet 1.

WITNESSES:
Frank Bayles
E. S. Woodborne

INVENTORS
John A. Chisholm.
BY Robert P. Scott.
William H. Sells.
Robert P. Scott
ATTORNEY.

No. 648,484. Patented May 1, 1900.
J. A. CHISHOLM, R. P. SCOTT & W. H. SELLS.
GREEN CORN HUSKING MACHINE.
(Application filed June 15, 1894.)
(No Model.) 3 Sheets—Sheet 2.
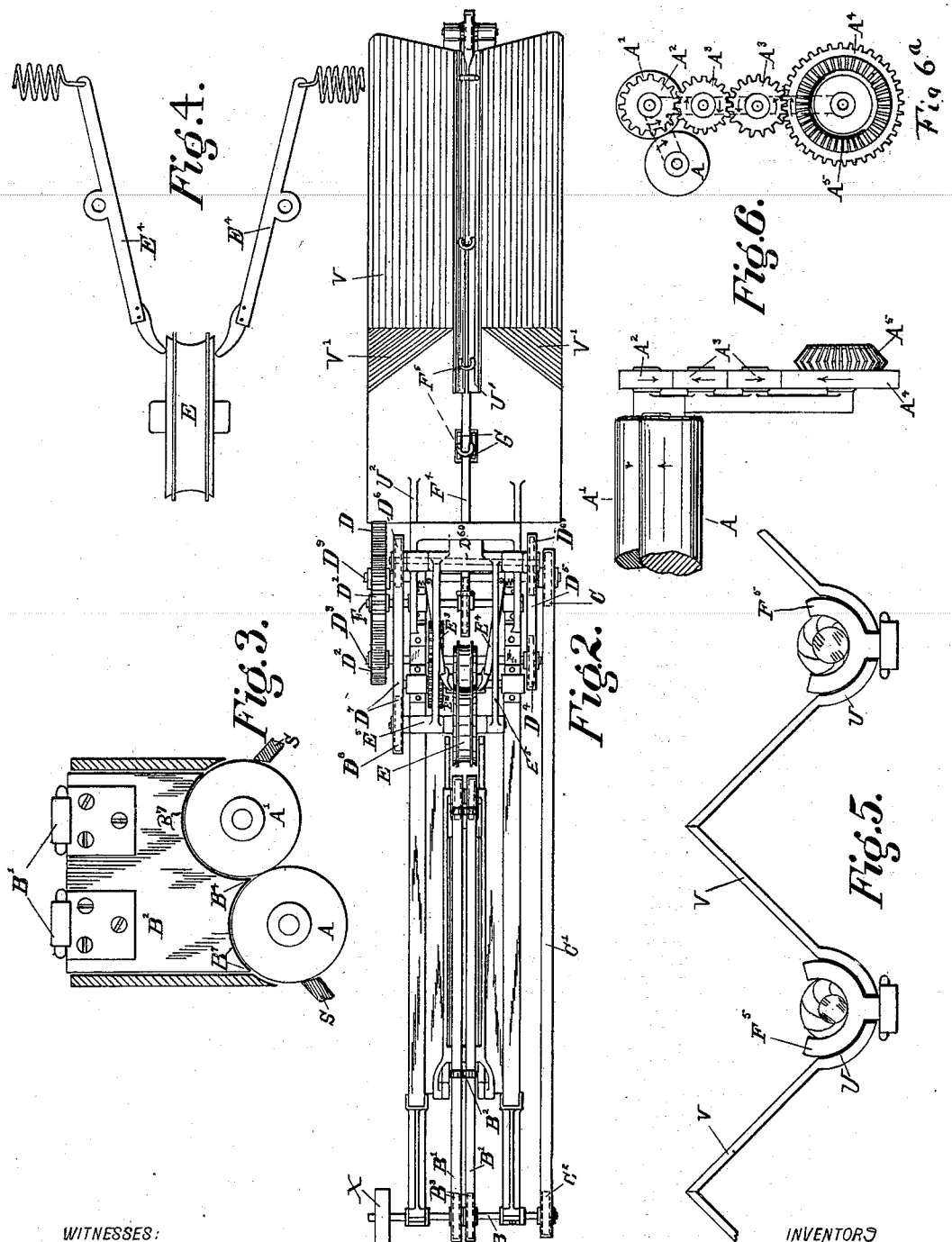
WITNESSES:
Frank Bayless
E. S. Woodhouse
INVENTORS
John Chisholm
Robert P. Scott
BY William H. Sells
Robert P. Scott
ATTORNEY.

No. 648,484. Patented May 1, 1900.
J. A. CHISHOLM, R. P. SCOTT & W. H. SELLS.
GREEN CORN HUSKING MACHINE.
(Application filed June 15, 1894.)
(No Model.) 3 Sheets—Sheet 3.

United States Patent Office.

JOHN A. CHISHOLM, OF OAKVILLE, CANADA, ROBERT P. SCOTT, OF CADIZ, OHIO, AND WILLIAM H. SELLS, OF BUFFALO, NEW YORK; SAID SELLS ASSIGNOR TO JOHN A. SELLS, OF MONTESANO, WASHINGTON.

GREEN-CORN-HUSKING MACHINE.

SPECIFICATION forming part of Letters Patent No. 648,484, dated May 1, 1900.

Application filed June 15, 1894. Serial No. 514,713. (No model.)

*To all whom it may concern:*

Be it known that we, JOHN A. CHISHOLM, a subject of the Queen of Great Britain, residing at Oakville, Ontario, Canada, and ROBERT P. SCOTT, residing at Cadiz, Harrison county, Ohio, and WILLIAM H. SELLS, residing at Buffalo, New York, citizens of the United States, have invented a new and Improved Green-Corn-Husking Machine, set forth in the annexed specification.

A number of machines for removing the husk from dried corn have been devised and a number of them are efficient in operation. But few machines for husking green corn have, however, been devised, and so far as known to us none of them are capable of doing their work on a practical and commercial scale. The reason for this state of facts lies in this, that whereas it is a very easy matter to husk dry corn, the brittleness of the husk, the separation of the leaves from each other and from the corn, and the absence of all moisture or glutinous substances causing the ear to be ready to drop from the husk with the slightest effort, it is, on the other hand, an entirely-different and far more difficult matter to husk green corn, in which the leaves are close together and closely embrace the ear and are glued thereto. In consequence the husking of green corn presents a problem for which the results attained in husking dry corn are applicable in such a small measure that it becomes a different art.

In our experiments to build a green-corn-husking machine which should be efficient in practice and which should have a sufficient capacity to warrant its adoption as against hand labor, which is unusually rapid, we have devised several types of machines of which the one herein shown is the best. In our prior efforts it was necessary to butt the ears before subjecting them to the husking operation, which made it very difficult to feed the butted ears properly, so that the machine had but little capacity. In the machine of this application the butting is unnecessary, although, of course, the machine will also husk ears which have been previously butted. In order, however, to have a machine which will tear off the husks and butts from green corn without previously butting the corn, a number of difficulties arise, which we have overcome in the machine of this application.

This machine consists, generally speaking, of husking devices, slitting devices, and a conveyer. The husking devices are in the form of parallel rolls, which by their friction tear off the husk and butt. As the butts especially are liable to clog the rolls, clearing devices are necessary. These at the same time may constitute feeding devices for those ears of corn which are lying in the bite of the rolls, so that the ears are spaced along the rolls and but one ear at a time can occupy any given portion of the rolls. Cleaning and scraping means are added, and a jet of water constantly playing upon the rolls not merely keeps them clean, but, as we have discovered, improves their grip upon the husk. The slitting devices are circumferentially arranged around the passage for the corn, and two of them revolve and may act to feed the corn toward the husking-rolls. The conveyer is of the sprocket-chain type, running in a trough of peculiar cross-section, whereby we insure that but one ear at a time is fed, and an open space and kicker are also provided to remove surplus ears and insure a uniformity of feed. The shape of the conveyer in side elevation is also of peculiar utility, having a substantially-horizontal portion at each end for receiving the corn from the wagons and for feeding it to the slitters and an intermediate inclined portion for allowing surplus ears to fall off.

Figure 7:
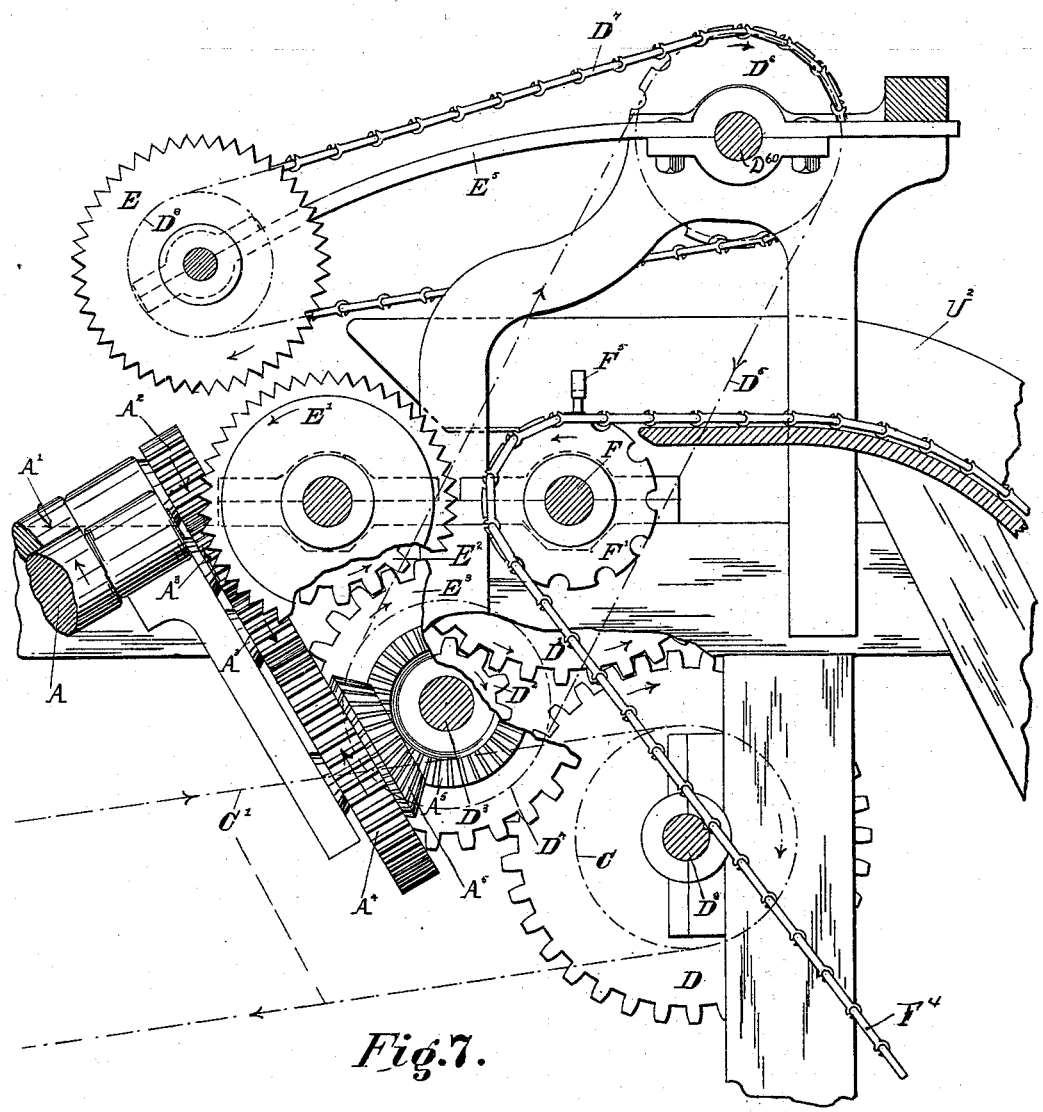

In the drawings, Figure 1 is a longitudinal section. Fig. 2 is a plan. Fig. 3 is a transverse sectional detail through the husking-rolls. Fig. 4 is a detail of the slitters. Fig. 5 is an end elevation of the conveyer. Figs. 6 and 6ª are details of the gearing for driving the husking-rolls; and Fig. 7 is a detail of the gearing for driving the slitters, rolls, and conveyer-chain, several of the wheels being broken away and the main drive-wheel and chain appearing in dotted lines.

The husking devices consist of rolls A A', which have their axes parallel and are set at an incline to the horizontal and one slightly above the other. These rolls are driven by small pinions $A^2$ $A^3$, meshing with each other, and the pinions $A^3$ meshing with a gear-wheel $A^4$, to the flat side of which is secured a bevel-wheel $A^5$, which meshes with a bevel-wheel on the shaft $D^3$. To this shaft is rigidly secured a gear $D^2$, meshing with a gear $D'$ on the shaft F. The gear $D'$ in turn engages a gear D on a shaft $D^9$, to which shaft is secured a sprocket C, around which passes a chain $C'$, driven by the sprocket $C^2$ on the driving-shaft B. Power is thus communicated from the driving-shaft to the pinion $A^2$, which rapidly revolves the husking-rolls.

Situated above and parallel to the length of the husking-rolls are sprocket-chains $B'$, receiving their motion from the shaft B by means of sprockets $B^3$. Two sprocket-chains are used instead of one broad chain, as we thereby secure greater strength, ease of construction, and a possibility of their passing around the sprocket-wheels without buckling. To these sprocket-chains are rigidly secured at equal intervals feeding and cleaning devices $B^2$ $B^7$ and the clearing devices $B^4$. As will be seen from the sectional view, these devices lie closely adjacent to the surface of the rolls and have a projection $B^4$, which fits in between their contacting surfaces. These devices $B^2$ $B^4$ $B^7$ thus effect several very important functions in the green-corn-husking operation.

It may be said that one of the main difficulties in husking green corn, especially such as is not butted in advance, lies in the fact that the green husk when it is torn off the cob gets between the contacting surfaces of the rolls and forms a wedge which the rolls cannot force through. The hard cylindrical butts are especially liable to thus stick between and clog the rolls. This not only uses up a considerable amount of extra power, which is of lesser consequence, but it makes just so much of the surface as is clogged useless for further husking, and, in fact, a piece of but a half an inch long can, by preventing the corn to be husked from lying flat on the rolls, make some seven or eight inches of the rolls inoperative. The clearing devices $B^4$ are therefore a very important feature of our invention, since they positively force out such clogs and butts from between the rolls and continuously keep them clear. We ascribe much of the success of our machine as a green-corn husker to these clearing devices.

The devices $B^2$ effect another function—that of a feed or spacer. It is necessary for a successful green-corn-husking machine that but one ear at a time shall occupy any given part of the husking devices—that is to say, the ears must be spaced apart, so that there shall be no jostling or crowding. By means of devices to be described later on we throw one ear at a time upon the rolls, and the feeding devices $B^2$ act to keep the ears which may be on the rolls quite separate. In fact, as the edges of the feeders $B^2$ snugly embrace the rolls, it may be said that the sprocket-chains $B'$, the rolls A, side-boards P, and the feeders $B^2$ form compartments for the corn, there being but one ear to each compartment. The feeders $B^2$ thus form spacing devices. The inclination of the rolls may be so great that the corn will slide down against a feeder $B^2$ and be kept from moving off the rolls too quickly. In this case the feeders would act as negative feeders; or the inclination of the rolls may be so slight that the feeders will force the corn down the rolls, in which case they would act as positive feeders. Particular attention is called to the fact that the feeders $B^2$ lie closely adjacent to and in the bite of the rolls A $A'$, so as to constitute feeding devices for the corn which is lying directly against the surface of the rolls, whereby a spacing action is possible. If the feeders were situated at some distance above the rolls, so as to act on corn which was not in the bite of the rolls, but upon any corn which had crowded above the corn actually in the bite, it would be seen that the feeders $B^2$ would no longer act as feeders for the corn actually under husking operation and would not act as spacing devices.

The devices $B^2$ in addition to being clearing, feeding, and spacing devices have also the function of scraping the surface of the rolls to keep them clean by reason of their contour fitting the contour of the rolls. The surfaces $B^7$ thus act as cleaning devices. Furthermore, the sprocket-chains $B'$ lie so close to the rolls as to prevent any corn from rising up vertically on its butt, which it has a strong tendency to do. This proximity of the chains $B'$ to the rolls is quite important in this respect, for if the chains were at some distance above the rolls the corn would rise up and strike the chains, thus clogging them. We prevent the corn from rising at all in the first place.

We have shown the clearing device $B^4$, the feeding and spacing device $B^2$, and the cleaning device $B^7$ as in one piece. They may, however, be made in separate pieces.

In order to still further insure the cleanliness of the rolls, we attach scraping devices S along their sides, as shown in Fig. 3. Furthermore, we have found that a stream of water directed upon the rolls not only acts to clean them, but to give them a better grip on the husk of green corn. We therefore use a water-supply nozzle W near the upper end of the rolls. Again, we find that the rolls should be covered with nearly pure rubber and that their exact diameter is of extreme importance. We find a diameter of two and one-half to two and three-fourths inches efficient.

We have now to describe the slitting devices, which are situated at the ends of the husking-rolls and act to slit the husk of the corn longitudinally in a number of lines about its circumference and may also act as feeding devices for the corn.

The slitting devices which we have shown consist of two horizontally-disposed spring-actuated arms $E^4$, bearing slitting-knives at their ends, and two or more vertically-disposed rotary saw-toothed slitting-disks E E'. These slitting devices are arranged around to constitute a passage for the corn. The upper slitting disk or disks E are carried on a shaft journaled in a swinging arm $E^5$, so that the slitting-disk has a vertical motion and is pressed down against the corn by its weight or by additional weights or springs, which may be arranged to act on the arm $E^5$. Since the slitting-disk E is positively rotated, although bodily movable, peculiar devices are needed to convey a rotary motion to said disk. The device which we have chosen consists of sprocket-wheels $D^6$ $D^8$ and a sprocket-chain $D^7$. The sprocket-wheel $D^6$ receives motion from shaft $D^{60}$ and sprocket $D^{61}$ by means of a chain $D^5$, which is moved by the sprocket $D^4$ on the shaft $D^3$, to which motion is communicated, as before described. Although we do not confine ourselves to the specific gearing shown, it possesses marked advantages in giving a high speed of revolution to the upper slitting-disk and in permitting this disk to be set as close as possible to the ends of the husking-rolls. The lower slitting-roll E' receives motion from a gear $E^2$ on the same shaft which meshes with a gear $E^3$ on the shaft $D^3$. These slitting devices are obviously of the utmost importance in the operation of our machine. Unless the husk of the corn is slit at a number of places it would be practically impossible to remove the husk from green corn by the rolls. Especially is this true when the butts are not previously removed by a butting operation, but are pulled off with the husk. For husking green corn these slitters may be well said to be indispensable. The types of slitters we have shown possess also peculiar advantages. The rotary slitters act more effectively than a mere stationary slitter, and the saw-teeth not only cut the husk more thoroughly and quickly, but prevent the rotary knives from sinking in too deep and injuring the corn. Besides, in the type we have shown the rotary slitters act also as feeding devices for the corn, and thus render the use of separate feed-rolls unnecessary, thus rendering the machine simpler and more compact. By having a number of slitters arranged around the passage for the corn we insure the slitting of the husk at a number of places around its circumference, and by mounting the slitters in a yielding manner, and especially by so mounting the rotary slitter, we secure a slitting of the husk as near to the butt as possible, since the yielding slitters will follow the contour of the corn, and the shape of the rotary slitter adds to this effect, as the shape of the rotary slitters at their point of closest proximity corresponds in a measure to the shape of the butt-end of the corn.

We have now to describe the conveyer, the function of which is to select a single ear from a mass of ears thrown in at the feed end and to feed such single ear into the machine. In fact, as before indicated, we have found that the success of a green-corn-husking machine depends in a large measure upon handling one ear at a time and in not allowing two ears to interfere with each other. Although a wagon-load of ears may be dumped upon the end of the conveyer, it is the business of this conveyer to see to it that one ear and only one ear at a time is passed to the slitting devices, and the other parts of the machine must see to it that when they have thus received a single ear they must keep it single. The conveyer which we have shown is the result of a number of experiments with radically-different types and is found efficient in practice.

Generally speaking, the conveyer is of the sprocket-chain type and comprises a chain $F^4$, passing around sprockets F' $F^2$ $F^3$ and receiving motion from the sprocket F' on the shaft F. The conveyer consists of a horizontal portion H, on which the ears are dumped, a curved portion H', connecting with a steeply-inclined part $H^2$, which is in turn connected by a curved portion $H^3$ with a horizontal part $H^4$. The corn may thus be received from the wagons on the horizontal portion H, and by means of the intervening curved and inclined portions be delivered at a greater height in a horizontal position to the slitters by means of the upper horizontal part $H^4$.

The shape of the conveyer-trough in cross-section is shown in Fig. 5, and it will be seen to consist of a U-shaped bed, with V-shaped flaring sides connected thereto, the diameter of the U-shaped bed being a trifle larger than the diameter of the corn to be husked. In practice a number of our machines will be placed side by side, so that the apices of the V's of the several conveyer-troughs will touch, as shown. The U-beds extend to the point U', and the V-shaped sides extend to a wedge-shaped end piece V'. Then comes the absolutely-unobstructed inclined portion $H^2$, which is perfectly flat and has no sides, after which the U-bed begins again at $U^2$.

The sprocket-chain $F^4$ passes along the bottom of the conveyer-trough and has attached thereto at intervals corresponding to the intervals between the spacers and feeders $B^2$ a series of U-shaped attachments $F^5$ for grasping the butts of the corn to be husked. If we suppose now that a number of ears are dumped on the horizontal portion H of the conveyer, the V-shaped sides will guide such ears as are lying substantially lengthwise of the trough into the U-shaped bed; but any ears which lie partially or entirely crosswise will be held up above the U-bed and will not obstruct the passage of the attachments $F^5$, which, as shown, will grasp the butt of any ear lying in the bed and carry it upward. The ear thus caught will be properly centered by the U-bed and the attachment F⁵; but should the ear not be properly caught or centered or should there be two ears between a single pair of attachments F⁵ the ear which is not held by an attachment will on passing the inclined portion H² with unobstructed sides fall out of the path of the sprocket-chain down onto the wedge V' and thence back to the V-shaped trough. This is an extremely-important feature of the conveyer. As before stated, a regularity of feed, ear by ear and but one ear at a time, is of the essence of a successful green-corn-husking machine. As it frequently happens that two short ears will lodge between a single pair of attachments F⁵, it is necessary to remove the upper ear, first, so that two ears may not be fed between a single pair of feeding devices B² on the husking-rolls, where they might crowd and clog, and, second, so that the upper ear would not be fed through the slitters E E' and onto the husking-rolls at the moment when a feeder B² is coming around the upper sprocket B³, as otherwise this feeder would jam the corn into the husking-rolls and clog and break the feeder.

It is to be understood that the attachments F⁵ and the feeders B² are so timed that an ear which has its butt caught by an attachment will be fed through the slitter a few moments before the corresponding feeder B² comes around the upper sprocket B³, so that the ear and feeder B² will not jam and so that also the ear may be thrown out onto the husking-rolls by the slitters and be gripped by these rolls while the ear is yet stationary thereon and before the feeders contact with it and force it along, which we find gives a better chance for a good grip. If now there are two ears lying between a single pair of attachments F⁵, it is evident that since the parts are timed to properly feed the lower ear, which is caught by the attachments, they are not timed to feed the upper ear, which would clog and perhaps break the machine unless removed. The inclined portion H², with unobstructed sides, effects this removal, as before indicated. It thus appears that the shape of the conveyer, with two horizontal portions H H⁴ at different heights and the connecting inclined portion H², is not merely a convenient means for feeding the corn at the proper angle from a lower to a higher level, but also has the essential mechanical function of supplying a necessary inclined clearing-space for superfluous (and thereby dangerous) ears; but we do not rely on this inclined portion H² alone to clear out superfluous ears. It may happen that the superfluous ear is by accident so centered and caught onto the lower ear as not to fall out by gravity when reaching the incline H² or that an ear may be caught upside down in an attachment F⁵ with its butt held in the attachment and the body of the ear on the lower side. Such ears must be forcibly removed, and we do this by a kicker G, pivoted at about the middle of the inclined portion H² and actuated by a lever G', pivoted at G² and actuated at the proper time by a projection G³ on the sprocket F². This kicker positively insures that there shall be a clear space behind each attachment F⁵, so that a clogging at the upper end of the rolls is impossible. By using the sprocket F² for actuating the kicker we dispense with an extra element. It is necessary, however, to make the circumference of this sprocket equal to the distance between the attachments F⁵.

It is unnecessary to describe at length the operation in detail, since this will be evident from the above description. The unbutted ears are dumped in at H, are centered, and carried to the free space at H², where superfluous ears are removed, after which the ears pass onto the portion H⁴, and thence to the slitters, where they are thrown onto the husking-rolls. Here the husks, and possibly the butts, are torn off by the gripping action of the rolls, which are kept clear and clean by the means described. The husked ears are ejected at the lower ends of the rolls.

We desire to call especial attention to the compactness of the machine in a transverse direction. As it is necessary to handle single ears in husking green corn we attain a large capacity by placing a number of machines side by side. This renders it possible to build machines which shall all be of the same size, and then the user can place as many together as he needs for his purpose.
Again, attention is called to the compactness of the gearing at the upper ends of the husking-rolls and to the means of conveying motion to the rolls by small gears, so as not to obstruct the passage for the corn.

We do not go at length into a description of the modifications which we consider fall within our invention. At best we could describe but a few of these, and such description might be taken to exclude as of our invention the modifications not described. We shall therefore rely on the terms of our claims to cover such modifications as fall within our invention.

What we claim is—

1. A green-corn-husking machine comprising the combination of parallel husking-rolls, clearing devices projecting into the bite of the rolls, means for moving the clearing devices parallel to the axes of the rolls, and means for preventing the corn from rising on the rolls, substantially as described.

2. A green-corn-husking machine comprising the combination of parallel husking-rolls, clearing devices projecting into the bite of the rolls, sprocket-chains parallel to the axes of the rolls on which the clearing devices are mounted, and means for preventing the corn from rising on the rolls, substantially as described.

3. A green-corn-husking machine comprising the combination of parallel husking-rolls, clearing devices projecting into the bite of the rolls, a pair of sprocket-chains parallel to the axes of the rolls to each of which the clearing devices are secured, said chains preventing the corn from rising on the rolls, substantially as described.

4. A green-corn-husking machine comprising the combination of a pair of parallel husking-rolls, feeding devices immediately adjacent to the surface of the rolls and arranged to act on the ears lying in the bite of the rolls, and an endless carrier above and parallel to the axes of the roll on which the feeding devices are mounted and which acts to prevent the corn from rising up on the rolls, substantially as described.

5. A green-corn-husking machine comprising the combination of parallel husking-rolls, side-boards, a sprocket-chain above and parallel with the rolls carrying feeding devices, said feeding devices lying immediately adjacent to the surface of the rolls with no third part between them, and the side-boards, sprocket-chains, feeding devices and rolls forming the walls of compartments for the corn holding it from displacement in any direction, substantially as described.

6. A green-corn-husking machine comprising the combination of husking devices and power-driven feeding-slitters at the feed end of the husking devices whereby the corn is both slit and fed onto the huskers at one operation.

7. A green-corn-husking machine comprising the combination of parallel husking-rolls and yieldingly-mounted, power-driven, rotary feeding, slitting-disks at the feed end of the rolls, substantially as described.

8. A green-corn-husking machine comprising the combination of parallel husking-rolls with means for feeding the corn parallel to their axes, a power-driven rotary slitting disk or disks and gearing for revolving the disks more rapidly than speed of the feeding means along the rolls, whereby the ears are shot onto the rolls and the space between the slitters and rolls is bridged, as described.

9. A green-corn-husking machine comprising the combination of husking devices and a power-driven saw-toothed feeding-slitter at the feed end of the huskers which acts to both feed and slit the corn, substantially as described.

10. A green-corn-husking machine comprising the combination of parallel husking-rolls with means for feeding the corn parallel to their axes, and yieldingly-mounted power-driven saw-toothed disks at the feed end of the rolls which act to both feed and slit the corn as described.

11. A green-corn-husking machine comprising the combination of husking devices and a conveyer having V-shaped sides comprising a lower substantially-horizontal portion for receiving, selecting and alining the mass of ears, an upper portion on a plane with the husker for feeding the selected ears, an intermediate portion for discharging superfluous ears, and a carrier movable along the several portions, substantially as described.

12. A green-corn-husking machine comprising the combination of husking devices and a conveyer comprising a lower substantially-horizontal portion for receiving the mass of ears an upper portion on a plane with the husker for feeding the ears and an intermediate inclined, open-sided portion for permitting superfluous ears to fall back substantially as described.

13. A green-corn-husking machine comprising the combination of husking devices and a conveyer comprising an inclined portion and an automatically and periodically actuated kicker for removing superfluous ears substantially as described.

14. A green-corn-husking machine comprising the combination of husking devices and a conveyer having a bed and an endless carrier in the bed, said conveyer comprising a horizontal portion for receiving the mass of ears, an upwardly-extending inclined portion for discharging superfluous ears and an upper portion substantially in a plane with the huskers for feeding the selected ears to the husking devices substantially as described.

15. A green-corn-husking machine comprising the combination of husking devices and a conveyer having in section a U-shaped bed and flaring V-shaped sides, the conveyer comprising a lower substantially-horizontal portion, upwardly-extending inclined portion and an upper substantially-horizontal portion substantially as described.

16. A green-corn-husking machine comprising the combination of husking devices, a conveyer having in section flaring V-shaped sides and an endless carrier having carrying attachments fitting the end of the ear, the conveyer having horizontal portions and an intermediate portion comprising a clear space for the removal of superfluous ears substantially as described.

17. A green-corn-husking machine comprising the combination of husking devices, feeding devices for the corn on the husking devices, a conveyer for the corn and a kicker for ejecting superfluous ears timed to work in unison with the feeding devices substantially as described.

18. A green-corn-husking machine comprising the combination of parallel husking-rolls, feeding devices for feeding the corn therealong parallel to their axes, a separate conveyer provided with attachments and mechanism for operating the feed devices and conveyer attachments in coöperative unison substantially as described.

19. A green-corn-husking machine comprising the combination of parallel husking-rolls, a sprocket-chain carrying feeders moving along the rolls, a separate conveyer provided with attachments and mechanism for operating the feeders and attachments in coöperative unison substantially as described.

20. A green-corn-husking machine comprising the combination of parallel husking-rolls, a sprocket-chain carrying feeders moving along the length of the rolls, a separate sprocket-chain conveyer carrying attachments and mechanism for operating the feeders and attachments in coöperative unison.

21. A green-corn-husking machine comprising the combination of parallel husking-rolls, feeding devices for feeding the corn therealong parallel to their axes, a power-driven slitting and feeding device for both slitting the corn and feeding it to the rolls and a separate conveyer provided with attachments for feeding the corn to the slitters just before a feeder on the rolls is ready to come into action.

22. A green-corn-husking machine comprising parallel husking-rolls, one above the other, a cleaning device projecting into the bite of the rolls and mounted to move parallel to their axes, substantially as described.

23. In a green-corn-husking machine, the combination with a feed device of rotary cutters arranged adjacent to the delivery portion of the feed device, and husking devices arranged in the rear of said cutters, the operative portions of the cutters having a movement from the feed device toward the husking device and having a speed greater than that of the feed device, substantially as set forth.

JOHN A. CHISHOLM.
ROBERT P. SCOTT.
WILLIAM H. SELLS.

Witnesses as to signatures of John A. Chisholm and William H. Sells:
BRUCE WINNER,
M. A. GEARON.

Witnesses as to signature of Robert P. Scott:
FRANK BAYLESS,
E. S. WOODBORNE.